June 6, 1961  O. W. MANDELL  2,987,084
PORTABLE POWER SAW
Filed Aug. 15, 1960

ORVILLE WILLIAM MANDELL
INVENTOR.

BY Zoltan O. St. Palley
Patent Agent

United States Patent Office 2,987,084
Patented June 6, 1961

2,987,084
PORTABLE POWER SAW
Orville W. Mandell, Clinton, Conn., assignor to Jarvis Corporation, Middletown, Conn., a corporation of Connecticut
Filed Aug. 15, 1960, Ser. No. 49,581
3 Claims. (Cl. 143—43)

My invention relates to portable power saws and has particular utility in the meat industry when employed as a scribing saw.

In the meat packing industry one of the important operations is the scribing of the meat carcasses, which is usually accomplished by the use of portable power saws, called scribing saws. The modern scribing saws are light enough to be held by one hand enabling the operator to use his other hand for the steadying of the meat carcass during the scribing operation. It is significant in the scribing operation that the depth of the cutting must be varied quite frequently to obtain the best results. With the customary scribing saws the frequent changing of the depth of the cut represents considerable inconvenience and loss of time because in these the changing of the position of the depth gauge requires the use of both hands and the readjusting of the depth gauge cannot be done safely without stopping the rotation of the saw blade. A more serious aspect of this situation is that, in case an overconfident operator attempts to change the adjustment of the depth gauge of the customary scribing saws without stopping the rotation of the saw blade, the result may easily be a serious injury of the operator.

The principal object of my invention is to preclude such accidents by providing a scribing saw in which the adjustment of the depth gauge, controlling the depth of the cut, can be changed by a slight movement of the thumb of the hand holding the handle of the scribing saw, and without removing the hand from the handle and also entirely without the cooperation of the other hand of the operator. As during the readjusting of the depth gauge both hands of the operator remain in their normal working position the physical possibility of an injury is eliminated.

Another important object of my invention is to provide a portable power saw in which the position of the depth gauge, controlling the depth of the cut, can be changed instantly and safely without stopping the sawing operation, thereby avoiding loss of time in the work.

A further important object of my invention is to provide a portable power saw with a novel adjustable depth gauge which is simple in construction, reliable in operation and economical in manufacture.

Other objects and advantages of my invention will be apparent during the course of the following description.

In the accompanying drawing, forming a part of the present application, wherein for the purpose of illustration is shown a preferred form of my invention:

Figure 2:
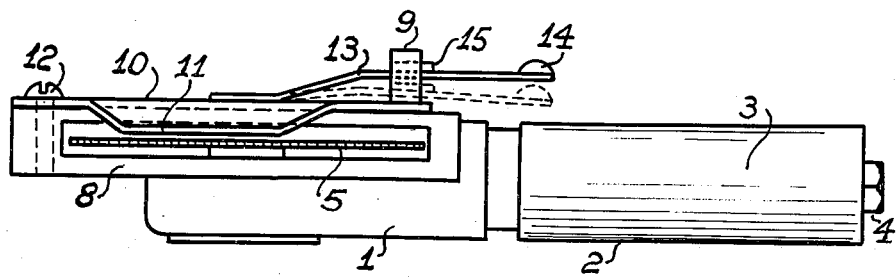
FIGURE 2 is the bottom view of the same.

Referring to the drawing, the numeral 1 represents the housing of the saw, shown in FIG. 2. Attached to this housing is the handle 2 which is tubular and contains the driving means. In the preferred form illustrated the handle 2 is cylindrical and contains a pneumatic motor 3, having the supply connection 4 for attaching an air hose. In alternative forms of my invention the driving means may be hydraulic or electric, also the driving motor may be located separately from the portable saw and connected to it by means of a flexible drive shaft.

Rotatably mounted on the housing 1 is a circular saw blade 5, having an axis of rotation substantially perpendicular to the axis of the cylindrical handle 2, and driving connection is provided between the saw blade and the driving motor for obtaining the rotation of the saw blade. In the present example the saw blade is detachably mounted on a mandrel running in ball or roller bearings, supported by the housing 1, and the driving connection with the motor 3 is made up of suitable gears and shafts, all enclosed within the housing 1.

Secured to the housing 1 is the guard 8, which is so constructed as to expose the working part of the saw blade doing the sawing, and to enclose the remaining, or idle part of the saw blade, for the protection of the operator from injury by the saw. In the drawing the numeral 6 represents the working portion and 7 the idle portion of the periphery of the saw blade.

Figure 1:
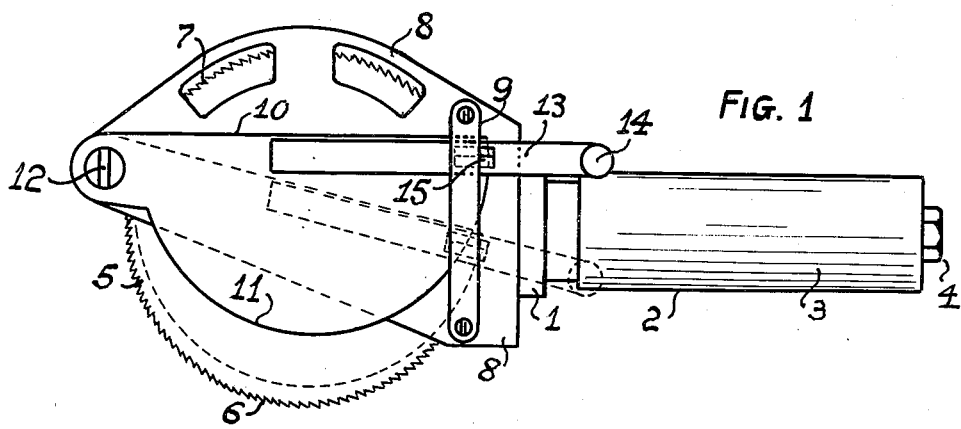
FIGURE 1 is a side elevational view of my power saw.
Figure 3:
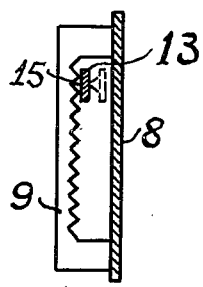
FIGURE 3 is a side view of the adjusting rack with a sectional view of the guard.

One of the important elements of my invention is the depth gauge 10, which is pivotally mounted on the guard 8, and has its working edge or guiding edge 11 located adjacent to saw blade 5. The depth of the cut in this device is determined by the radial distance between the working periphery 6 of the saw blade and the working or guiding edge 11 of the depth gauge, and this is adjustable by the angular movement of the depth gauge 10 around the pivot 12. The radial movement of the depth gauge 10 is controlled by two novel elements: the adjusting rack 9 and the adjusting lever 13. The adjusting rack 9, shown in FIGS. 1, 2, and 3, is secured to the guard 8, and surrounds the adjusting lever 13, which is secured to the depth gauge 10 and is so located that the free or operating end 14 of the said lever is always within the reach of the thumb of the hand holding the handle 2. This adjusting lever 13 is so constructed that by the pressure of the thumb it can be flexed from the normal position, shown by the full lines in FIG. 2, into the depressed position, shown by the dotted lines. In the form illustrated this flexibility is obtained by making the adjusting lever 13 of a thin strip of resilient material. In alternative forms of my invention this depressibility of the lever 13 may be obtained by a suitable hinge and a separate spring forcing the lever 13 against the rack 9 (see FIG. 3). The adjusting lever 13 is provided with a spur 15, so arranged that in the normal position of the lever 13 the spur 15 engages the rack 9, and thereby locks the depth gauge 10 in its angular position. In the depressed position of the lever 13 the spur 15 will release the rack 9, thereby making it possible for the operator to move the lever 13 and the connected depth gauge 10 angularly, around the pivot 12, by the thumb of the hand holding the handle 2, until the required depth adjustment is reached. When the thumb is removed from the operating end 14 of the handle 13 the spur 15 will automatically engage the rack 9, thereby locking the depth gauge 10 in its angular position.

Thus, in my invention the adjusting of the depth gauge requires only the depression of the adjusting lever and the angular motion of the depth gauge, both of which can be accomplished by the thumb of the hand holding the saw handle and without the use of the other hand; also without the need for stopping the sawing operation.

It is to be understood that the form of my invention herein shown and described is only an example of the same, and that various changes in the shape, size, and arrangement of parts may be resorted to, without departing from the spirit of my invention or the scope of the subjoined claims; also that the term saw blade includes all types of circular cutting blades.

I claim:

1. A portable power saw comprising a cylindrical handle containing the driving motor; a housing connected to said handle; a circular saw blade rotatably mounted on said housing and having an axis of rotation substantially perpendicular to the axis of the said handle; driving connection between said motor and saw blade, disposed within said housing; a guard mounted on said housing, enclosing the idle portion and exposing the working portion of the periphery of said saw blade; an adjusting rack mounted on said guard; a depth gauge pivotally mounted on said guard, having a working edge adjacent to said saw blade, at a distance from the working periphery of said saw blade, adjustable by the pivotal motion of said depth gauge; an adjusting lever secured to said depth gauge, having its operating end located near the inner end of said handle for convenient actuation by the thumb of the hand holding the handle, said lever being resilient so as to be flexed by the thumb into its depressed position and returning into its normal position when released by the thumb; a spur secured to said adjusting lever and so positioned that it will engage said adjusting rack in the normal position of said lever and thereby lock the depth gauge in the particular position, and said spur will release the adjusting rack in the depressed position of said lever permitting the angular movement of said adjusting lever and the connected depth gauge around said pivotal connection for the purpose of adjusting the depth of the cut of the saw blade.

2. A portable power saw comprising a housing; a handle secured to said housing; a circular saw rotatably mounted on said housing; driving means to rotate said saw; a guard mounted on said housing partially surrounding said saw; an adjusting rack secured to said guard; a depth gauge pivotally mounted on said guard and being adapted to change the depth of the cut by its angular motion around said pivotal mounting; an adjusting lever secured to said depth gauge and having its free end accessible for the thumb of the hand holding said handle, said lever being resilient so as to be flexed by said thumb into its depressed position and returning into its normal position when released by said thumb; a spur secured to said adjusting lever and so positioned as to engage said adjusting rack in the normal position of said adjusting lever and thereby lock the depth gauge in the particular position, and said spur will release said adjusting rack in the depressed position of said lever permitting the angular motion of said depth gauge by said thumb for the purpose of adjusting the depth of the cut of the saw.

3. In a portable power saw having a handle, a rotatable saw blade and a guard over said saw blade, the combination comprising an adjusting rack secured to said guard; a depth gauge pivotally connected to said guard and being adapted to change the depth of the cut by its angular motion around said pivotal connection; an adjusting lever secured to said depth gauge and having its free end accessible for the thumb of the hand holding said handle, said lever having a normal position and a depressed position obtainable by the action of said thumb, and being provided with a spur so positioned as to engage said rack in the said normal position, thereby preventing the angular motion of said depth gauge, and to release said rack in said depressed position, thereby permitted the angular motion of said depth gauge by the action of said thumb for the purpose of adjusting the depth of the cut of said saw blade.

References Cited in the file of this patent

UNITED STATES PATENTS

| | | |
|---|---|---|
| 1,546,982 | Hilthon et al. | July 21, 1925 |
| 1,811,577 | Crowe | June 23, 1931 |
| 1,885,087 | De Witt | Oct. 25, 1932 |